United States Patent [19]

Choi et al.

[11] Patent Number: 5,478,677
[45] Date of Patent: Dec. 26, 1995

[54] COMPOSITE GAUNTLET/SEPARATOR

[75] Inventors: Wai M. Choi, Newton; Ingo W. Schmidt, Boston, both of Mass.

[73] Assignee: Daramic, Inc., North Charleston, S.C.

[21] Appl. No.: 375,204

[22] Filed: Jan. 18, 1995

Related U.S. Application Data

[63] Continuation of Ser. No. 121,403, Sep. 13, 1993, abandoned.

[51] Int. Cl.$^6$ .................................................. H01M 2/16
[52] U.S. Cl. .................. 429/249; 429/140; 429/141; 429/225; 429/251; 429/254
[58] Field of Search ........................... 429/140, 141, 429/251, 254, 225, 249

[56] References Cited

U.S. PATENT DOCUMENTS

| | | | |
|---|---|---|---|
| 2,305,121 | 12/1942 | Wheat | 136/55 |
| 2,806,076 | 9/1957 | Yamaura et al. | 136/55 |
| 2,896,006 | 7/1959 | Sundberg | 136/43 |
| 2,904,611 | 9/1959 | Duddy | 136/43 |
| 3,207,632 | 9/1965 | Dickover et al. | 136/16 |
| 3,972,728 | 8/1976 | Sundberg et al. | |
| 4,042,436 | 8/1977 | Sundberg et al. | 156/182 |
| 4,048,398 | 9/1977 | Sundberg | 429/140 |
| 4,048,399 | 9/1977 | Terzaphi | 429/141 |
| 4,144,115 | 3/1979 | Sundberg | 156/161 |
| 4,328,922 | 5/1982 | Remer | 429/140 |
| 4,650,730 | 3/1987 | Lundquist et al. | 429/62 |

FOREIGN PATENT DOCUMENTS

| | | |
|---|---|---|
| 765891 | 9/1971 | Belgium . |
| 2709484 | 9/1977 | Germany . |
| 800734 | 7/1958 | United Kingdom . |

*Primary Examiner*—Prince Willis, Jr.
*Assistant Examiner*—M. Nuzzolillo
*Attorney, Agent, or Firm*—Nields & Lemack

[57] ABSTRACT

A battery separator for tubular positive electrodes composed of a microporous, composite sheet product having first and second major surface, formed from a uniform mixture of a polymer, a filler, a processing aid a porous form stable layer at least partially embedded in either the first or second major surface and having a series of vertical tubes arranged across its surface. The tubular sleeve/separator can be formed of individual tubes, flat sheets formed into a series of tubes or sheets containing half tubes and which are aligned and bonded together to form the series of tubes.

16 Claims, 2 Drawing Sheets

COMPOSITE GAUNTLET/SEPARATOR

BACKGROUND OF THE INVENTION

This application is a continuation of application Ser. No. 08/121,403 filed Sep. 13, 1993, now abandoned.

One typical style of lead acid battery has a series of flat electrodes (positive and negative).

A different type of plate can be and is used in storage or traction batteries in which tile positive plate is tubular such as is shown in FIG. 1. These tubular or clad plates (1) contain a hard lead rod (2) centered in a porous tube (3) as the current conductor. The rod (2) is surrounded by loose, compacted active material (4). The tubes (3) are typically formed of a woven or braided porous tube of glass fibers, plastic fibers or combinations thereof are commonly known as "gauntlets". The tubular positive plates are separated from flat negative electrode plates (5) by a microporous separator (6), typically in leaf form or alternatively formed as an envelope around the negative plate. While the tubes in FIG. 1 are shown to be circular, it is understood that the tubes may be square, oval or rectangular.

While this tubular electrode type of battery is useful, especially in long term batteries such as traction or motive power supplies standby power supplies, emergency lighting, etc., their assembly is time consuming and expensive. It would be desirable to have a tubular electrode design which is simpler and less costly to manufacture and which would provide improved performance characteristics to the electrode and battery in which it is used.

SUMMARY OF THE INVENTION

The present invention is directed to a novel composite battery separator, to positive tubular electrodes made with such composite separators and to improved batteries which incorporate such separators and tubular electrodes.

The present invention further relates to a lead acid battery having a case, at least one pair of electrodes of opposite polarity, a negative electrode being a flat plate and a positive electrode being tubular in design, a separator between the positive and negative electrodes and an electrolytic composition, wherein the the separator forms a part of the positive electrode, is formed as a series of tubes for retaining the positive electrode and comprises a first microporous layer formed of a substantially homogenous blend of a thermoplastic polymer, an inert filler and a processing aid, wherein the ratio (by weight) of polymer to filler is from about 1:2 to about 1:10; and a second porous form stable layer at least partially embedded in one surface of the first layer.

A composite battery separator for a tubular positive electrode comprising a microporous filled plastic layer of a substantially uniform mixture of from 1:4 to 1:10 wt. ratio of a polymer and an inert filler and having a porous form stable layer embedded in at least one of the first and second major surfaces of the microporous layer, and having porosity throughout the separator's thickness and wherein the separator is capable of being formed into a series of one or more tubes for retaining one or more tubular positive electrodes.

Further the present invention relates a positive battery electrode comprising:

a.) a center lead rod;

b.) loose, compacted, active material surrounding the rod; and c.) one or more tubular sleeve/separators surrounding and containing the rod and the active material, wherein the sleeve/separator is formed of a first microporous layer comprising a siliceous filler, and a thermoplastic polymer and a second porous, form stable layer bonded to the first layer and wherein the second layer of the sleeve/separator is adjacent to the active material of the electrode.

The subject composite separator is formed of a microporous sheet composed of a substantially uniform mixture of polymer and filler present in a ratio by weight of from about 1:2 to 1:10 preferably 1:4 to 1:10 and a porous, layer embedded at least partially therein. The separator is capable of being formed in exisiting equipment and by exisiting processes with minimal modifications to either.

IN THE DRAWINGS

DETAILED DESCRIPTION

The present invention provides a flexible sheet material having high void volume, porosity of a microporous nature and of a configuration which substantially inhibits dendrite formation. The subject sheet material has high tensile strength and ductility sufficient to withstand handling during electrode and battery formation, is capable of being formed into desired shapes for use as a sleeve/separator in a tubular positive electrode of a lead acid battery, is capable of exhibiting a high degree of stability to the battery environment over sustained periods of time and of allowing a high degree of electrical conductivity (low electrical resistance). Still further, the subject sheet material has the ability to maintain its integrity and performance characteristics while being able to be formed into a tubular sleeve/separator combination.

Figure 2:
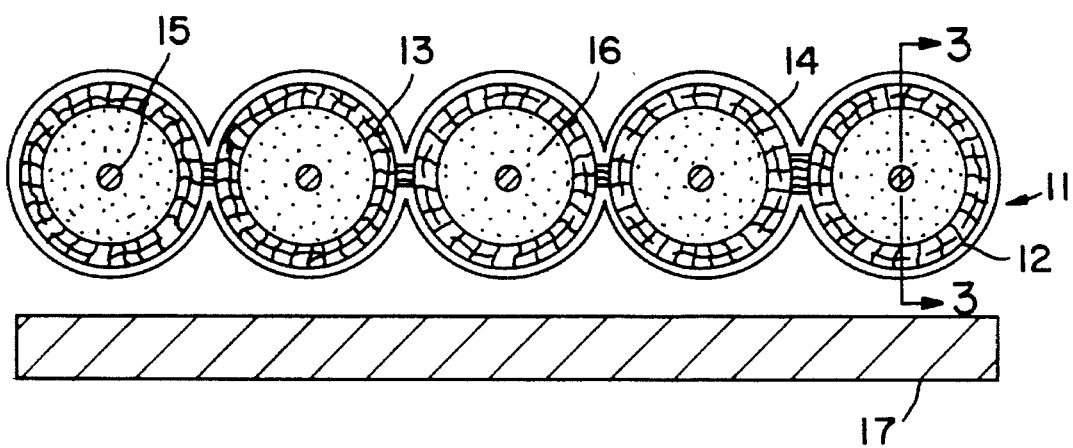
FIG. 2 shows a cross sectional view of a tubular battery assembly according to the present invention.

FIG. 2 shows a cross sectional view of a positive electrode using a sleeve/separator according to the present invention.

Figure 1:
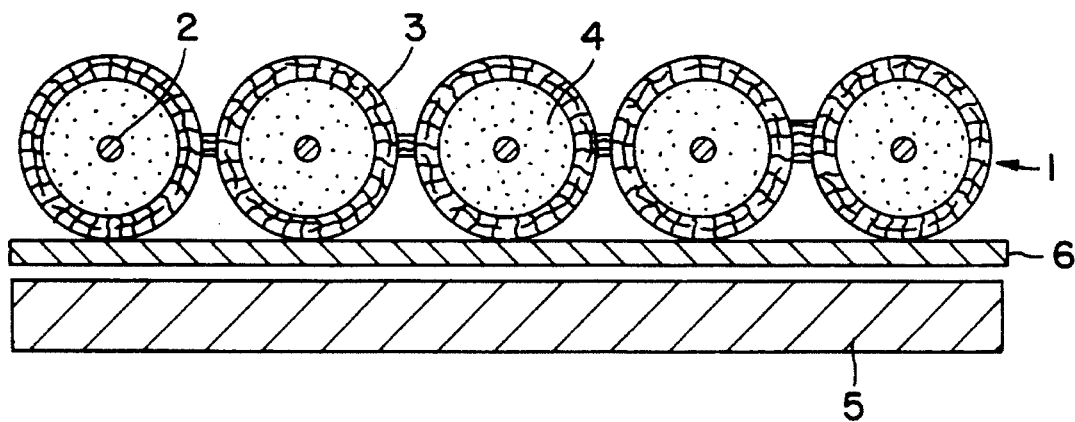
FIG. 1 shows a cross sectional view of a tubular battery assembly as known in the prior art.
Figure 3:
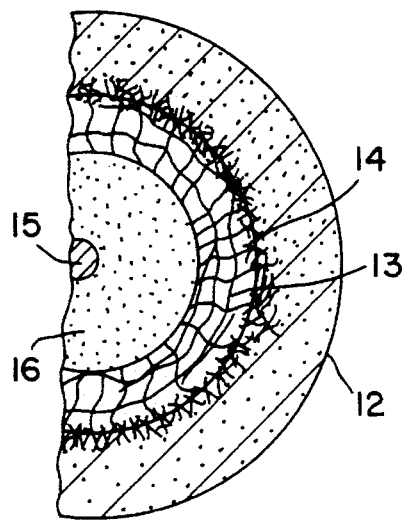
FIG. 3 shows a close in cross sectional view of the separator/electrode assembly of FIG. 2 taken along lines 3—3.

The sleeve/separator is formed of two or more distinct layers. The first layer is a microporous polymeric layer 12 composed of a substantially uniform composition formed of a polymer arid an inert filler, wherein the ratio of polymer to filler (by weight) is from about 1:2 to about 1:10, preferably 1:4 to about 1:10, more preferably 1:4 to about 1:8, most preferably 1:6 to 1:8. The layer also contains from 0 to 254 by weight of the components of the first layer of a processing aid. The second layer is a porous, form stable layer 13, being at least partially embedded into one of the two major surfaces of the first layer as shown at the interface 14 between the two layers 12 and 13 at FIG. 3. The sleeve/separator of the present invention should be in the form of a thin sheet or tube of a thickness of less than 50 mils (1.27 mm). The electrode itself is identical to that of FIG. 1 having a center rod 15 and compacted active material 16. Likewise, the negative plate 17 is the same as in FIG. 1.

One embodiment of the present invention comprises a flat composite sleeve/separator which is folded in half and then sealed along the outer edges and at spaced, even intervals across its width to form a series of tubes. The areas can be sealed by heat, adhesives, mechanical means, such as a cold pressure weld or by stitching of a thread. The center rod is then placed into the series of tubes and loose active material is then placed and compacted around the rod in each tube to form a positive tubular electrode.

Alternatively, two flat sheets may be used to form the tubular sleeve/separator. In this embodiment, the bottom as well as the edges of each tube must be sealed.

Figure 4:
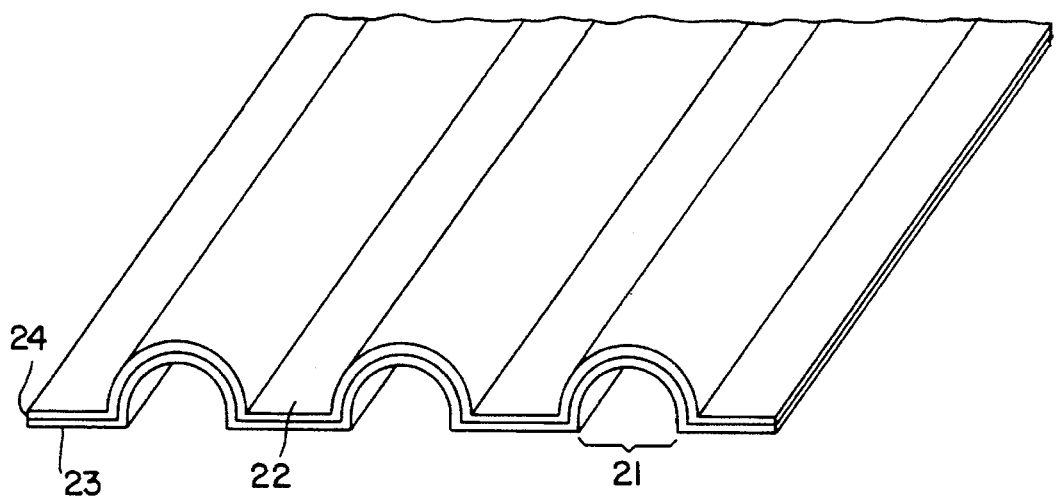
FIG. 4 shows another embodiment of the present invention in a planar view.

In a third embodiment shown in FIG. 4, the composite sleeve/separator may be formed so as to have a series of half tubes 21 with flat portions 22 in between. The embodiment shown has the form stable layer 23 on the inner side of the semitubes and the microporous layer 24 of the outer surface. Such an sleeve/separator can be formed by either folding it back upon itself or by using two pieces, as discussed above with the earlier embodiments, and sealing the edges between the adjacent tubes. The bottom in the latter embodiment may be sealed by crimping, a heat seal, caps or a polymeric seal.

The semi or half tubes can be formed as part of the process of making the composite sleeve/separator or it can be formed as a separate step. Preferably, it is formed as part of the initial process. For example, the semi or half tubes can be formed by use of a grooved or embossed calender roll which causes the shape to form as the microporous plastic layer and form stable layer are pressed together to form the composite structure. A similar process may be used after formation of the sleeve/separator sheet via heated rolls or other such means so long as the porosity and strength of the sleeve/separator are not jeopardized.

Figure 5:
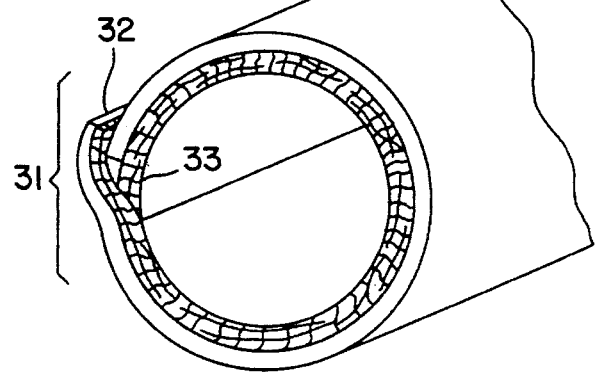
FIG. 5 shows another embodiment of the present invention.

A further embodiment is to form individual tubes, which may be arranged to form a positive electrode plate of one or more adjacent tubes. Such tubes can be formed by coextrusion of the polymer and form stable layer (in tubular form), or as shown in FIG. 5 by rolling a flat sheet around a mandrel into such a tube 31 and sealing the overlapped edges 32, 33 as shown in FIG. 5. The ends of such tubes may be sealed by caps, polymeric plugs, crimps, etc.

The composition of the resultant sheet product will depend upon the components used, their respective ratios and the degree of extraction of the processing aid and/or filler. The processing aid can be completely removed, leaving a highly filled polymeric sheet product or, alternatively, can have at least 60 percent and, preferably, 85 percent of the processing aid of the admixture removed. These products normally show good retention of physical properties, as well as good electrical stability and oxidation resistance. The microporous layer of the sheet product normally has from about 5 to 25 percent (by weight) of the polymer mixture, about 8 to 95 percent filler, and from about 0 to 20 percent processing aid. More preferably the microporous plastic layer comprises a mixture of from 15 to 25 percent polymer, 75 to 85 percent filler, and from 0 to 10 percent processing aid.

The resultant composite sleeve/separator is a microporous material sheet of very high porosity (porosity of at least 50 vol. percent, preferably greater than 60 vol. percent and even up to 90 vol. percent). Very thin, flexible sleeve/separators having good mechanical properties of tensile strength, ductility, high porosity and oxidation resistance have been unexpectedly formed.

The sleeve/separator is a flexible material capable of being folded upon itself and formed into a tubular design and which is capable of expanding and contracting caused by the volume change which occurs during the charging and discharging of the positive electrode's active material. This is surprising in view of the high amount of filler contained in the present composite sleeve/separator. Logic argues that the product should be stiff, brittle and inflexible. Yet the combination of the elements of the present invention provides a flexible, ductile product that can be easily folded and which can function as part of the positive electrode.

In certain instances, it is preferred that the sleeve/separator be void of patterns or other raised sections e.g. flat sheet or may contain raised portions, such as half tubes, ribs, etc.

A further improvement of the present invention is that the material is dimensionally stable, both during processing and use. Typically, plastic separators undergo some shrinkage during processing and use. For example, it has not been uncommon for separators formed of plastic and an inert filler to undergo a 10% reduction in width and length during extraction of the processing aid. This results in reduced porosity and reduced yield. Similarly, shrinkage is known to occur in the finished battery. Shrinkage in the battery exposes portions of the active material which may fall out of the tube or dry out or in the worst case contact an electrode of opposite polarity causing a short.

The composite sleeve/separator of the present invention is dimensionally stable both during processing and use. Typically, the product will shrink less than 3%, in both length and width, more typically less than 1%, depending upon the material of the form stable layer and its inherent tendency to shrink.

In addition to dimensional stability, the present invention also has high tensile strength. This is particularly useful in the formation of the product such as when a processing aid is being extracted, during processing of the product into an electrode and during use. Lastly, the tensile strength also provides improved resistance to puncture by parts of the battery, or by the assembly equipment. It also provides better resistance to cracking which may occur in separators which are folded and/or bonded together, especially into tubes.

Another advantage of the present sleeve/separator is its' ability to withstand oxidation and degradation caused by the battery environment, especially in consistent high temperature usage. It has been found that the present sleeve/separator will provide superior resistance to degradation caused by use of the battery at high temperatures (such as 70° C.) than is possible currently available products. This is important as more and more applications are experiencing higher use temperatures. Additionally, this is important in the present application where the separator will be adjacent the positive electrode which typically is a very oxidative environment. Such conditions place a severe strain on batteries and their components and tend to cause a premature and rapid oxidation of the separators which lead to cracks, holes and dendritic growth which cause battery failure. By providing an sleeve/separator with superior physical resistance to such conditions, one is able to provide a battery that can meet the changing use conditions that are occurring today.

A further unique feature of the present invention is the pore structure within the composite structure.

The pore structure is unique in that a number of separate, distinct pore types are formed. In the microporous layer, the pores are typically a microporous channel or tunnel of an average diameter of less than 1 micron as is a typically found in microporous plastic separators. The pore structure in the form stable layer is a of microporous generally of an average diameter of at least of about 10 microns and are formed between the overlaying and adjacent fibers. The pores formed at the interface between the form stable layer and the microporous plastic layer are microporous, but are formed as extended elongated pores formed along the length of the fibers which typically form the form stable layer. This is particularly so where the materials of the microporous layer and the form stable layer are different. For example, when the polymer is a thermoplastic, preferably a polyolefin and the form stable layer is formed of glass fibers, it has been found that the two materials are typically hydrophobic and hydrophilic (respectively) and therefore do not bond to each other readily. Rather, it is believed that the two layers tend to intermesh or entangle themselves within the other. This leads to the formation of these unique extended, elongate pores in the interface area. The pores are particularly suited for the retention of electrolyte within the separator. This is of particular interest to one in the battery field as it allows for the inclusion of more electrolyte in a given battery space than had previously been available. The increase in electrolyte allows for higher storage capacity and reserves, thus providing a better, stronger battery than had been previously available.

Another embodiment of the present invention provides a battery separator having low content, 0 to about 20 weight percent, preferably from 0 to about 10 weight percent of residual processing aid. It has been unexpectedly found that the majority or all of the processing aid can be removed due to the fact that the sheet material is composed of a major portion of a filler with a minor portion of polymer. It has been shown that the oxidation resistance of the sleeve/separator of the present invention is substantially independent of the amount of processing aid contained within it. This is a complete reversal from the separators formed today wherein oxidation resistance is substantially dependent upon the amount of processing aid present within the separator. When such a low processing aid sheet product is formed, as according to the present invention, the resultant sleeve/separator is capable of maintaining its high void volume, exhibits low electrical resistance when in the battery system, exhibits high tensile strength and exhibits superior oxidation resistance.

The polymer used to form the body of the sheet product of the present invention can be selected from polymers which are stable with respect to the acid battery environment. That is to say, the polymer must be free from being attacked and decomposed by the components making up the battery. The polymer must be stable to the strong acids used in an acid battery (e.g. sulphuric acid as electrolyte). Examples of polymers which are stable to an acid environment include polyolefins, halogenated polyolefins, fluoroethylenes, such as PTFE, as well as copolymers and mixtures thereof.

The preferred materials consist of at least a polyolefin, such as polyethylene or polypropylene, with or without other polymers, comonomers and/or other polymers.

A more preferred materials include an ultra high molecular weight polymer (UHMW polymer) such as an UHMW polyolefin (e.g. UHMW polyethylene or UHMW polypropylene), having a ZST value of 0.1 to about 6N/mm$^2$; a high density polyethylene; and linear low density polyethylene.

When an UHMW polymer is used as a blend with other polymers, it should be present in an amount sufficient in the matrix to provide its properties to the microporous material, namely high strength and flexibility. One or more additional polymers may also be present in the matrix so long as their presence does not materially affect the properties of the microporous material in an adverse manner. The amount of the other polymer(s) which may be present depends upon the nature and properties of such polymer(s). It is preferred that a thermoplastic polymer be used in such blends. The preferred thermoplastic polymers which may be present are low density polyethylene, linear low density polyethylene, high density polyethylene, poly(tetrafluoroethylene), polypropylene, copolymers of ethylene and propylene, copolymers of polyolefins with an ethylenically unsaturated monocarboxylic acid such as acrylic acid, methacrylic acid, or acrylates and methacrylates and mixtures thereof. If desired, all or a portion of the carboxyl groups of carboxyl-containing copolymers may be neutralized with sodium, zinc or the like.

The filler to be used in the sheet product of this invention should have high surface area (BET; about 20 to 950 m$^2$/gm, preferably at least 100 m$^2$/gm), high pore volume (BET; at least about 0.2 cc/gm; preferably at least about 1 cc/gm). The filler may be of any form, preferably of in particulate or fibrous form or mixtures of the two. The size of the ultimate (non-agglomerated) filler material should be very small having an average diameter of from about 0.01 to about 75 microns. The low end of the particle size range refers to single particles while the high end may include agglomerated or fibrous material. The particle size is preferably from about 0.01 to about 50 microns. The filler should be substantially free of large (greater than 100 microns) diameter particulate material (ultimate or agglomerate material).

The filler must be inert with respect to the lead/acid battery environment and must be substantially insoluble with respect to the extraction liquids when used in forming the subject sleeve/separator, as fully described hereinbelow.

A second filler whether porous or non porous may be used if desired, such as glass or carbon fibers or mineral whiskers.

The filler(s) component can be chosen from a wide variety of materials provided the filler is inert with respect to the battery components, such as the electrolyte composition, the electrodes and the like of the battery system in which the sleeve/separator is contemplated for use. The filler component must also be substantially inert with respect to the other components of the subject sleeve/separator including the polymers forming the polymer mixture, the processing aid and the like. Finally, the filler component should not be electrically conductive nor electrochemically active with respect to the battery system. Fillers which meet the above criteria will depend on tile type of battery system in which it will be employed, the particular components of the battery, etc. and can be readily ascertained by those skilled in this art. Preferably, the filler is not extracted by the battery electrolyte.

The material used as filler component of the sleeve/separator can be selected from a variety of materials such as metal oxides and hydroxides as, for example, oxides and hydroxides of silicon, aluminum, calcium, magnesium, barium, titanium, zirconium, cerium, iron, zinc and tin; add metal carbonates as, for example, carbonates of calcium and magnesium. Carbonaceous material as, for example, carbon black, may be used in small amounts in combination with the other filler material. Preferred fillers are siliceous materials, such as silica, talc, or diatomeceous earth.

The processing aid of the instant composition further improves the processability of the composition, i.e., lowers the melt viscosity, or reduces the amount of power input which is required to compound and to fabricate the composition and aids in inducing porosity. The microporous layer of the present invention is formed from an initial composition having a very high content of processing aid therein, such, at least about 60 vol. percent and preferably at least 70 vol. percent based on the initial composition, up to about 90 vol. percent based on the initial composition.

The processing aid can be soluble or insoluble in water. The preferred processing aids are selected from organic esters, including oligomers; and hydrocarbon materials. More preferred examples of the water-insoluble processing aids are such as tricresyl phosphate; and hydrocarbon materials such as petroleum oil, including lubricating oils and fuel oils and natural oils such as tall oils and linseed oils. Preferred processing aids should have a solubility parameters close to that of the polymer, preferably in the range of from 7.3 to about 8.4.

There are a number of water-insoluble, normally solid processing aids such as waxes which can be used alone or in conjunction with liquid processing aids.

The material used to form the form stable layer of the sleeve/separator must be a material which is inert to the battery environment and which has good tensile strength in both the machine and cross machine directions. Thus, the material can be, for example, selected from glass, polyolefins, fluoroethylenes, polyesters, nylons or polyacrylonitrile polymers or mixtures or copolymers formed with other stable monomeric units (i.e. polyacrylonitrile/polyacrylic aid copolymer; polyolefin/polyacrylic aid copolymer).

The form stable layer can be in the form of a scrim, a woven, a knit, braided or non-woven fabric, or similar product and can be formed from a continuous or non-continuous fibrous material. The fibers themselves may be porous or non-porous.

The layer may be planar (that is, have substantially planar major surfaces) or patterned (that is having raised or embossed sections on the major surfaces). It is preferable to utilize a planar layer to assure that the layer is properly embedded into at least a portion of the body (or thickness) of the microporous plastic layer.

The form stable layer is preferably formed from a substantially uniform, nonwoven material in the form of a scrim or fabric. It may be formed of a spun bonded or flash bonded or other similar material. The layer should have a tensile strength of at least 3 p.s.i. The particular thickness of the form stable layer is not critical. It should be thick enough to provide dimensional stability and electrolyte retention to the sheet product as desired and should be sufficiently thin so as to allow for the formation of a material suitable for use in a battery. Preferably, the form stable layer should be from about 1 mil to 50 mils in thickness, depending upon the desired properties.

Further, the form stable layer should be compressible.

Preferably, the form stable layer runs the length and width of the sleeve/separator. Two or more layers may be used if necessary or desired, either adjacent each other or on opposite sides of each other.

The form stable layer should have a porosity of at least 50% and may be microporous if so desired. Alternatively, it may be porous, such as having an average pore diameter of greater than about 10 microns.

As described above, the form stable layer should be at least partially embedded into at least one of the major surfaces of the microporous plastic layer. Alternatively, the form stable layer may be completely embedded into that layer. As another embodiment, two or more form stable layers whether formed of the same or different materials may be used and either partially or fully embedded into the opposite major first and second surfaces of the microporous plastic layer. The location and degree of embedding depends upon the desired configuration and end use of the sheet product. Preferably, the form stable layer is embedded deeply enough to bind the two layers together. Preferably, it is embedded at least 10%, more preferably about 30% to 70% into the thickness of the microporous plastic layer.

The process of forming the subject separator, as shown, comprises blending and heating the components for the microporous plastic layer to form a substantially uniform admixture thereof, forming the admixture into a sheet, tube or series of tubes, embedding the form stable sheet at least partially into a surface of the microporous plastic layer such as by a calendaring process and, subsequently extracting from said sheet product at least a portion of the processing aid contained therein. In view of the amount of filler, it has been surprisingly found that the subject composition is capable of being blended into a uniform admixture and formed into a sheet product using relatively low energy.

The procedure for extraction of the processing aid from a sheet product is well known and is not meant to form a part of the present invention, per se. A single stage extraction can be used. The solvent or extraction conditions should be chosen so that the polymer and filler components are essentially insoluble. For example, when petroleum oil is to be extracted from the composite sheet, the following solvents are suitable; chlorinated hydrocarbons, such as trichloroethylene, tetrachloroethane, carbon tetrachloride, methylene chloride, tetrachloroethane, etc., hydrocarbon solvents such as hexane, benzene, petroleum ether, toluene, cyclohexane, gasoline, etc. If water soluble processing aids are to be extracted, the extraction medium can be water, ethanol, methanol, acetone, aqueous or alcoholic sodium hydroxide, potassium hydroxide, and the like.

The extraction temperature can range anywhere from room temperature up to a temperature below (preferably at least 10° C. below) the melting or degradation temperature of the polymers used.

The time of the extraction will vary depending upon the temperature used and the nature of the processing aid being extracted. For example, when a higher temperature is used, the extraction time for an oil of low viscosity may be only a few minutes, whereas if the extraction is performed at room temperature, the time requirement for a polymeric processing aid can be in order of several hours. The final composition of the separator will depend upon the original composition and the degree of extraction of the processing aid from the sheet product.

When the sleeve/separator is to be provided with rib members, these members can be formed from the same composition as the microporous plastic layer or from other polymeric compositions which are compatible with the composition of the microporous layer. For example, other polymer compositions can be filled, unfilled or foamed polyolefins, polyvinyl chloride and the like and applied as stripes upon the surface of the microporous layer or the form stable layer. Preferably, the sleeve/separator is calendared or embossed to provide the ribs. Preferably, the ribs, when present, are formed by calendaring of the exposed surface of the microporous plastic layer.

The separator may contain additional components such as viscosifiers, surfactants, antioxidants, colorants, wetting agents, and the like. Such materials can be incorporated in the separator by having them made part of the composition, or having them separately applied by spraying and the like.

The following example is given for illustrative purposes only and are not meant to be a limitation on the subject invention, as defined by the appended claims. All parts and percentages are by weight unless otherwise indicated. The electrical resistance was measured and given below in Table I. The electrical resistance of each sheet product was determined by the direct current method as described by J. J. Lander and R. D. Weaver in Characteristics of Separators for Alkaline Silver Oxide-Zinc Secondary Batteries: Screening Methods, ed by J. Cooper and A. Fleicher, Chapter 6 modified by using 35% $H_2SO_4$ as the electrolyte, $Hg/Hg_2SO_4$ type reference electrodes, and Pt screens as the current carrying electrodes. The voltage drop across the reference electrodes was measured at 20 ma.

EXAMPLE I

A composite sleeve/separator was made from a blend of 5 pounds of an UHMW polyethylene, known as GUR 415 available from Hoechst, 32 pounds silica filler and 39 pounds processing aid, (mineral oil) (6:1 silica/polymer ratio with 70% oil). The blend was fed into an extruder and extruded through a die in the form of a continuous web. The web and a nonwoven form stable layer formed of a nonwoven glass mat 10 mils in thickness were fed through the nip of a calendar roll to form a flat sheet. The overall thickness of 42.2 mils (1.06 mm). The composite sleeve/separator was fed through a hexane bath to extract the processing aid to a residual level of about 14%. The resulting microporous sleeve/separator had the following characteristics:

Tensile Strength: $8.35 N/mm^2$
(cross machine direction)
Porosity: 70%!5%
Puncture Resistance: 3 psi
Shrinkage: <1%
(compared by measuring the web width before and after extraction of the processing aid)
Method D Shrinkage: Machine Direction - <1 Cross Machine Direction - <1

The sheet material was easily folded into a series of tubes, so as to form a tubular sleeve/separator sleeve.

What is claimed:

1. A lead acid battery having a case, comprising: a flat plate negative electrode; a tubular positive electrode containing a center lead rod and active material surrounding the lead rod; an electrolytic composition; and a microporous separator surrounding said positive electrode and containing said active material, said separator comprising a first microporous layer having micropores of an average diameter of less than 1 micron, said microporous layer being formed of a substantially homogenous blend of a thermoplastic polymer and an inert filler, wherein the ratio (by weight) of polymer to filler is from about 1:2 to about 1:10, and a second form stable layer having pores of an average diameter of at least about 10 microns, said second form stable layer being at least 30% to 70% embedded in said first microporous layer to form an interface.

2. The separator of claim 1 wherein the second form stable layer is a fibrous layer in the form selected from the group consisting of woven, nonwoven and knit fabrics, and wherein fibers are selected from polyesters, polyolefins, polynitriles, amines and glass and the layer has a tensile strength of at least 3 psi.

3. The separator of claim 1 wherein the polymer is a polyolefin.

4. The separator of claim 1 wherein the filler is a siliceous material having a surface area of from about 20 to 950 $m^2/gm$ and a pore volume of at least about 0.2 cc/gm, said filler having an average particular size of from about 0.01 to 50 microns and is substantially free of particle having a particle size larger than 100 microns.

5. The separator of claim 1 wherein the polymer is selected from the a group consisting of ultra high molecular weight polyolefins and halogenated olefins wherein the polymer has a ZST value of 0.1 to about $6N/mm^2$.

6. The separator of claim 1 wherein the first layer has a polymer matrix composed of from about 65 to 99.9 weight percent of a filler, from about 0.1 to 15 weight percent of an ultra high molecular weight polymer and from 0 to about 15 weight percent of a processing aid.

7. The separator of claim 1 wherein said first microporous layer comprises from about 80 to 98.5 weight percent filler, from about 1.5 to 10 weight percent polymer and from 0 to about 10 weight percent of processing aid.

8. A composite microporous battery separator for a tubular positive electrode comprising a microporous filled plastic layer having micropores of an average diameter of less than 1 micron, said microporous layer having a first and a second major surface and comprising a substantially uniform mixture of from 1:4 to 1:10 wt. ratio of a polymer and an inert filler and having a porous form stable layer with pores having an average diameter of at least about 10 microns, said form stable layer being at least 30% to 70% embedded in at least one of the first and second major surfaces of the microporous layer, and having porosity throughout the separator's thickness and wherein the separator is capable of being formed into a series of one or more tubes for retaining one or more tubular positive electrodes.

9. The battery separator of claim 8 wherein the filler is a siliceous material having a surface area of from about 20 to about 950 $m^2/gm$, and a pore volume of at least about 0.2 cc/gm, said filler having an average particle size of from about 0.01 to 50 microns and is substantially free of particles having particle size larger than 100 microns.

10. The battery separator of claim 8 wherein the form stable layer is a woven or non-woven sheet, and the separator has a total void volume of at least about 60 volume percent.

11. A composite microporous battery sleeve separator comprising a composite sheet product having a first microporous thermoplastic layer having micropores of an average diameter of less than 1 micron,, the first layer having an inert filler present in a ratio of polymer to filler (by weight) from about 1:4 to 1:10; a second porous fibrous form stable layer having pores of an average diameter greater than 10 microns, said second layer being at least 30% to 70% embedded in a surface of the first layer, the separator being formed into a series of tubes having a sealed bottom and sides.

12. A positive battery electrode comprising:

a.) a center lead rod;

b.) active material surrounding the rod; and c.) one or more microporous tubular sleeve/separators surrounding and containing the rod and the active material, wherein the sleeve/separator is formed of a first microporous layer having micropores of an average diameter of less than 1 micron and comprising a siliceous filler, and a thermoplastic polymer and a second porous, form stable layer having pores of an average diameter greater than 10 microns, said second layer being at least 30% to 70% embedded in a surface of the first layer, and wherein the second layer of the sleeve/separator is adjacent to the active material of the electrode.

13. The electrode of claim 12 wherein the form stable layer is formed of a non woven glass mat and the first layer is formed of a polyolefin and silica filler wherein the ratio (by weight) of polymer to silica is from about 1:4 to about 1:10.

14. The electrode of claim 12 wherein the tubular sleeve/separators are rolled from flat sheets into individual tubes having overlapping edges adjacent the edges of the flat sheet, which overlapping edges are sealed to each other.

15. The electrode of claim 12 wherein the sleeve/separators are formed of sheets folded in half and sealed at their outer edges and at spaced, even intervals across their widths to form the tubes.

16. The electrodes of claim 12 wherein the sleeve/separator is either flat or has a series of half tubes extending along its height and spaced apart across its width.

* * * * *